United States Patent

[11] 3,527,149

[72] Inventors Franz W. R. Starp
Calmbach, Black Forest, Germany;
Carl Richter, Calmbach, Black Forest, Germany
[21] Appl. No. 731,485
[22] Filed May 23, 1968
[45] Patented Sept. 8, 1970
[73] Assignee Prontor-Werk Alfred Gauthier, G.m.b.H.
Calmbach, Black Forest, Germany
a corporation of Germany
[32] Priority May 29, 1967
[33] Germany
[31] P 42,229

[54] PHOTOGRAPHIC CAMERA WITH AN ELECTRONIC TIMING DEVICE CONTROLLABLE BY LIGHT CONDITIONS
6 Claims, 5 Drawing Figs.

[52] U.S. Cl. ................................................. 95/10
[51] Int. Cl. ..................................................... G03b 7/08,
G01j 1/46
[50] Field of Search .................................. 95/10(C), 53

[56] References Cited
UNITED STATES PATENTS
3,063,354 11/1962 Matulik et al. ................. 95/10(C)UX
3,286,610 11/1966 Fahlenberg ..................... 95/10(C)UX
3,418,479 12/1968 Schmitt ......................... 95/10(C)UX

*Primary Examiner*—Norton Ansher
*Assistant Examiner*—Joseph F. Peters, Jr.
*Attorney*—March, Gillette and Wyatt ABSTRACT: A photographic camera having a circuit and an energy source associated with the circuit. A photo-resistance is associated with this circuit as is an electronic timing device for automatically controlling the exposure time. An indicating device is also associated with the circuit for indicating the light-dependent exposure time value, the indicating device being operable by current from said energy source or by another energy source. The circuit is provided with two circuits for testing the voltage and capacity of the energy sources and for indicating the attainable exposure time value with respect to a certain limiting value, the two circuits being actuatable by a single, manually operable test key.

Fig.1

Patented Sept. 8, 1970

INVENTORS
Franz W. R. Starp
Carl Richter

BY

March, Gillette & Wyatt
ATTORNEYS

INVENTORS
Franz W. R. Starp
Carl Richter
BY
March, Gillette & Wyatt
ATTORNEYS

PHOTOGRAPHIC CAMERA WITH AN ELECTRONIC TIMING DEVICE CONTROLLABLE BY LIGHT CONDITIONS

The invention concerns a photographic camera in which the exposure times are automatically controllable by means of an electronic circuit which includes a photoelectric resistor connected in the circuit of an energy source, and whereby the timing circuit has a device associated with it which is supplied with current by means of the same or a different energy source to indicate the exposure time value set in dependence upon light conditions.

In cameras having shutter time control by means of an electronic switching device it is necessary to keep the voltage drop of the energy source caused by current drain or ageing, under review. Thus to obtain correctly timed exposures the battery voltage must not have fallen below a predetermined value. To effect this a test button has been fitted to photographic cameras which, when actuated, indicates the usablility of the energy source either by a light flashing or by deflection of the pointer of a meter to a certain mark.

Occasionally however more than only one energy source or more than one function has to be tested. In this case it may concern the use of an energy source for the electric control circuit of the shutter, and a further energy source for a measuring circuit including a moving coil instrument. Furthermore it has proved necessary e.g. in such an exposure time control instrument attachable to any camera, to test both the voltage of the energy source and the value of the exposure time resulting, within certain limits. When such devices have been used to test the state of the voltage of an energy source or to carry out an exposure limit value indication, a test button has hitherto been provided for each of these tests.

The object of the invention is to avoid such duplication; in a camera of the kind referred to above it is proposed that two switching circuits may be brought into operation by a single manually actuated key, arranged for testing the voltage of the energy sources and/or to indicate the exposure time value obtainable with reference to a certain limit value. This device permits the photographer, with the aid of a simple rocker test switch, to check the readiness of the camera for taking photographs. An additional advantage is that the photographer need not have to know anything of the significance of either of the tests all that is necessary is for him to ascertain that the actuation of the test key produce the correct signal response.

In one embodiment of the invention the test key is adapted to be moved into either one of two alternative positions, in one switch position of an energy source for supplying current to the electronic timing device being tested, and in the other switch position an energy source provided to actuate a moving-coil meter is tested.

In a photographic camera having a time control device attachable to the camera, with a built-in energy source and a device to indicate an exposure time limit value, testing is carried out by arranging that in one switch position of the test key the energy source is tested, and in the other switch position of the key the switching circuit of the device for indicating the exposure time limit value is connected to the energy source.

To obtain a simple operation of the test device the test key acting on the contacts is made as a twin bladed tumbler switch mounted pivotably on a pin. To permit the tumbler switch to be adapted to given requirements with regard to the arrangement of the contacts, the test key may be provided with an additional switching finger acting on one or more contacts.

In an alternative embodiment of the test key, a sliding knob displaceable into either of two switch positions serves as common actuating member for the switch contacts.

The invention is described below by way of two embodiments and examples of application as illustrated in the accompanying drawings, in which.

Figure 1:
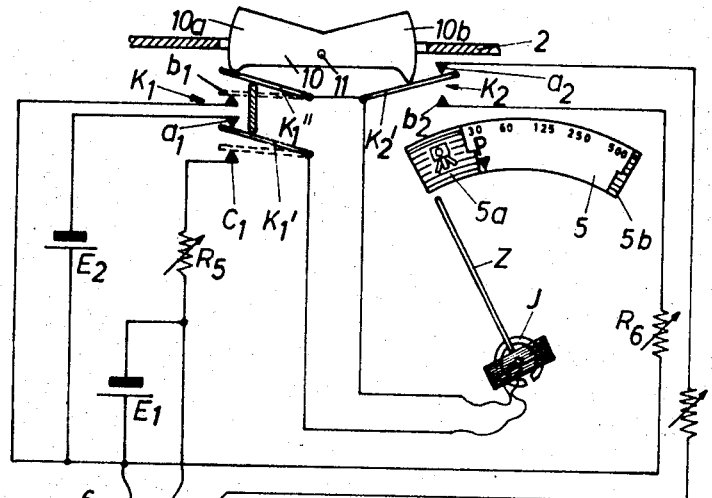
FIG. 1 is a camera shutter in plan view fitted with an electronic timing and testing device, together with part of the circuit thereof.
Figure 2:
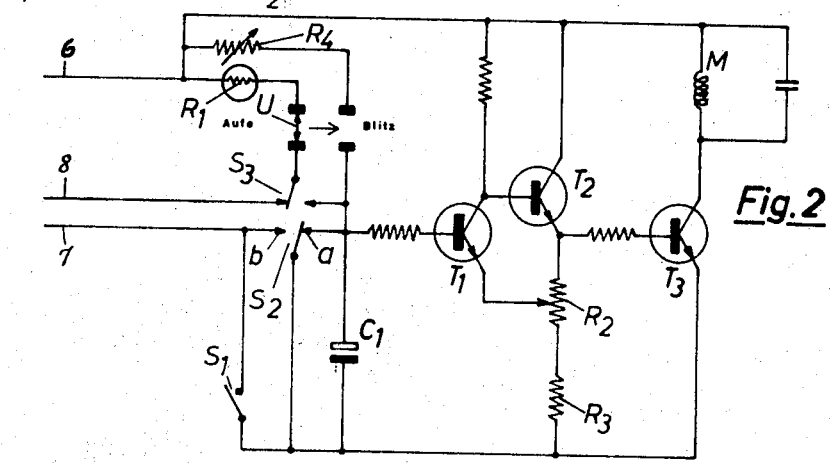
FIG. 2 is a circuit diagram of the electronic timing device built into the camera shutter.

Referring to FIG. 1 the numeral 1 denotes a shutter on a camera 2, the front plate 3 of which is provided with a transparent window 4 behind which a photoelectric resistor $R_1$ is located. The interior of the camera shutter 1 accommodates the individual structural components of a circuit of an electronic timing device shown in detail of FIG. 2. The latter is fashioned as a trigger circuit and for this it is provided with two emitter-coupled transistors $T_1$ and $T_2$. Transistor $T_2$ is connected to a switching transistor $T_3$ which is in series with an electromagnet M. The latter is a component of an electromechanical locking device, not further shown, holding the shutter blade system in an open position for the period of timing. To determine the threshold value (see later) of the trigger circuit a variable resistor $R_2$ and a fixed resistor $R_3$ are provided. There is a capacitor $C_1$ connected electrically with the transistor $T_1$. The circuit diagram as shown in FIG. 2 shows that by means of a switch U the photoelectric resistor $R_1$ serving to control the timing of the shutter in dependence upon the ambient lighting, may be replaced by a fixed resistor $R_4$. The object of this is to allow flash exposures which involve only a predetermined exposure time. The switch U enables the photographer to set the camera either to the working range "daylight automatic" or to an alternative working range "flash".

$S_1$ in FIG. 2 designates a main switch actuable by the camera release, by means of which the timing device is connected to a source of energy $E_1$ shown in the circuit of FIG. 1, before the actual release of the shutter 1. Charging of the capacitor $C_1$ of the timing device is initiated by a switch $S_2$ which is actuable, for example by the driving ring of the shutter blade system at the time at which the lens aperture is opened. A further switch $S_3$ is provided to change over the photoelectric resistor $R_1$ from the circuit of a testing and indicating device described in detail below, to the circuit of the timing device. The actuation of this switch, like that of the charge starting switch $S_2$, may be effected by means of the part serving to drive the shutter blade system. Contact $a$ is the charge starting contact and its contact $b$ is connected in parallel with the switch $S_1$, in order to take over its function during exposure times of longer duration than the shutter release depression.

The circuit shown in FIG. 1 shows a device providing testing and indication of the voltage state of two energy sources $E_1$ and $E_2$ built independently of one another in the camera housing 2. The timing circuit shown in FIG. 2 is connected to source $E_1$, whilst the energy source $E_2$ is provided to actuate a measuring circuit including a moving-coil meter J. The moving-coil meter is provided with a pointer Z which has an indicating scale 5 associated therewith, the scale being calibrated with time values from one-thirtieth sec. to one-five-hundredth sec., to indicate to the photographer the exposure time expected before making an exposure. Furthermore the scale 5 has a test marking P, the significance of which is described in detail below, together with two warning panels 5a and 5b at each end respectively. When the pointer Z moves into the region of the warning panel 5a, then the photographer can conclude that adequately-exposed photographs can be obtained only by a time exposure, since on account of the prevailing light conditions the exposure will be longer than one-thirtieth sec. When the pointer Z moves into the warning panel 5b, over-exposure of the film material is to be expected. In FIGS. 1 and 2 the individual supply leads serving the connection of the energy sources $E_1$ and $E_2$ with the electronic timing device and the indicating device described above are denoted by 6, 7 and 8.

To test the energy sources $E_1$ and $E_2$ for their capacity and voltage state, contact switches $K_1$ and $K_2$ are provided, these switches being actuable independently of one another. The contact switch $K_1$ is provided with two synchronously moving contact blades $K_1'$ and $K_1''$, of which the blade $K_1'$ in the rest position makes contact with a fixed contact $a_1$ connected to the negative pole of the energy source $E_2$. The blade $K_1''$ is disconnected in the rest position. When actuated, it encounters contact $b_1$, which is connected with the positive pole of the energy sources $E_1$ and $E_2$, whilst at the same time the blade $K_1'$ encounters contact $c_1$ which is connected with the negative pole of the energy source $E_1$. The blade $K_2'$ of the contact switch $K_2$ in the rest position lies against a contact $a_2$ to which the lead 8 is connected. The blade $K_2'$ has a further contact $b_2$ associated therewith, which is connected with the positive poles of the energy sources $E_1$ and $E_2$ and with the leads 6 and 7. The two blades $K_1''$ and $K_2'$ are electrically interconnected.

Figure 3:
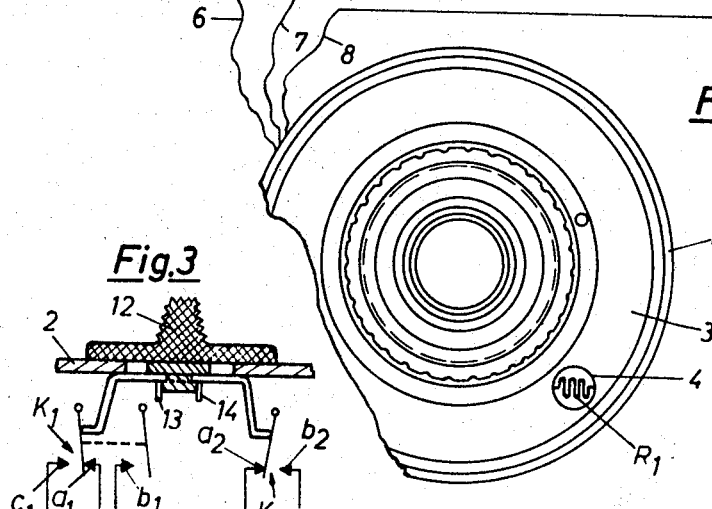
FIG. 3 is a test key with switching slider.

In order to test one or the other of the energy sources $E_1$ or $E_2$ the two contact switches $K_1$ and $K_2$ have a manually actuated key 10 associated therewith. The latter as shown in FIG. 1, may for example be made as a two-bladed tumbler switch rotatably mounted on an axis 11. One blade 10a acts on the contact switch $K_1$, and the other blade 10b acts on the contact switch $K_2$. As shown in FIG. 3, the switch could be replaced by re-arranging the contacts so as to be operated by a sliding button 12 having two switching positions. An important switching feature of the contacts, which in FIG. 3 receive the same reference numerals, is that only two alternate switching conditions with a central neutral position are provided; in one switching position contact switch $K_1$ and in the other switching position the contact switch $K_2$ is actuated. Concerning the specific location of the tumbler key 10 or the slider 12, the latter is expediently so arranged on the camera housing 2 that the switching member, though being readily accessible, assumes a position away from the part of the camera held by the user. Both the tumbler key 10 and the sliding switch 12 are so formed that on release they return automatically into the central position shown. For this purpose the switching blades $K_1'$, $K_1''$ are resiliently clamped at one end. Flat springs 13 and 14 may also be additionally provided which return the sliding switch 12 shown in FIG. 3 into the central position.

When due to pressure on the blade 10a the test key 10 is actuated, or the sliding switch 12 (FIG. 3) has been displaced to the left, switch $K_1$ is changed over, i.e. the blade $K_1'$ is separated from contact $a_1$ and reaches contact $c_1$. Blade $K_1''$ also makes contact with contact $b_1$. In this way the meter J is connected via the two contacts $b_1$ and $c_1$ to the energy source $E_1$ provided to supply the electronic timing device with current. Current now flows from the positive pole of the energy source $E_1$ via the contact $b_1$ and via the two blades $K_1''$ and $K_2'$ to the meter J and from there via the contact $c_1$ and the variable resistor $R_5$ back to the negative pole of the energy source $E_1$. Due to this switching operation the meter J deflects to a position dependent upon the voltage of the energy source $E_1$ and the resistance value of the resistor $R_5$. This resistor must now be adjusted so that the pointer Z of the meter J deflects precisely to a test mark "P" marked on the scale 5 when the energy source to be tested has a voltage which corresponds to the lowest which is considered allowable.

If on the other hand the vane 10b of the test key 10 is actuated or the slide 12 is urged to the right, then the contact $K_2'$ of the blade $K_2$ is changed over from contact $a_2$ to the contact $b_2$. The result is that a circuit is formed from the energy source $E_2$ via the resistor $R_6$, the contact $b_2$, the meter J, the contact $a_1$ of the switch $K_1$ back to the energy source $E_2$. The meter J is deflected to an amount determined by the voltage of the energy source $E_2$ and the value of the variable resistor $R_6$. The latter is adjusted so that the pointer Z of the meter J deflects to the test mark "P" of the scale 5 when the voltage of the energy source $E_2$ is the lowest permissible in practice.

Figure 4:
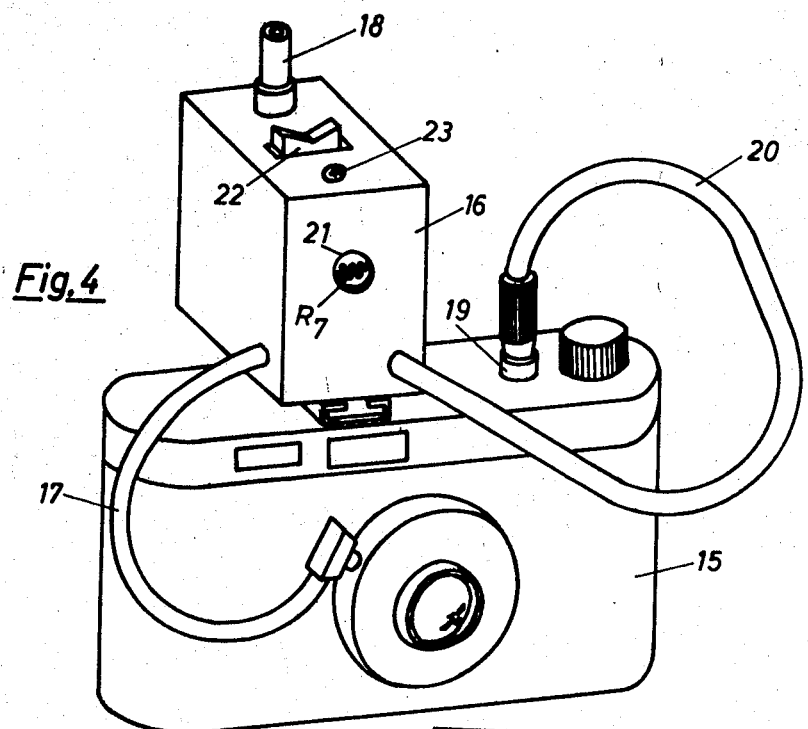
FIG. 4 is a perspective view of an electronic time control device mounted on the housing of a camera.
Figure 5:
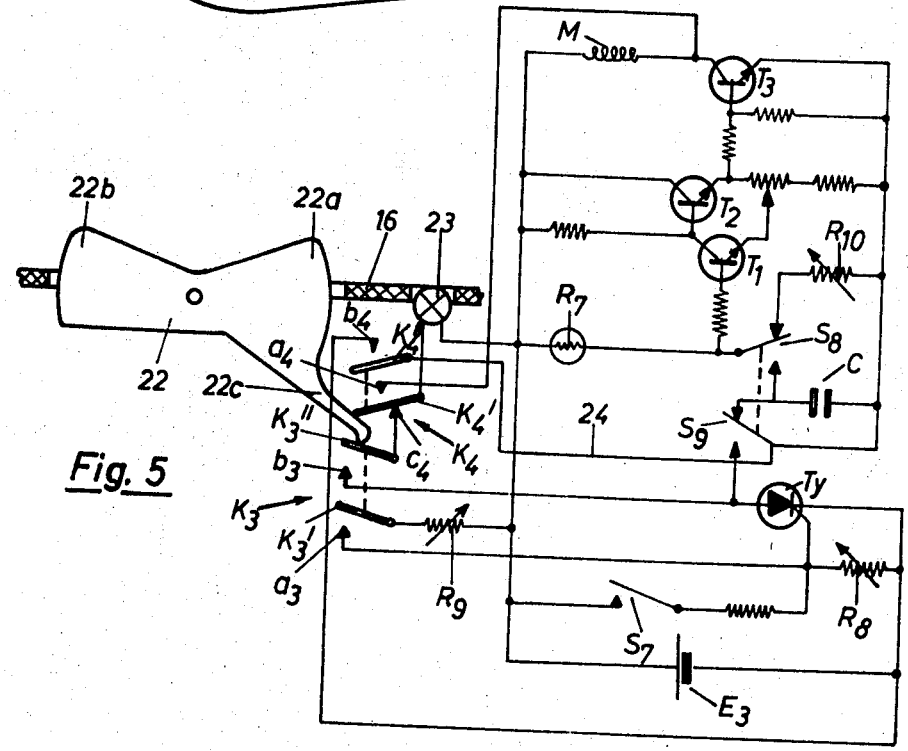
FIG. 5 is a circuit diagram of the electronic control device of FIG. 4.

FIGS. 4 and 5 show a further embodiment of a testing and indicating device included in an exposure time control device 16 mountable on a camera 15. There is an electronic timing device which after change-over of the camera shutter to the "B" range and after release, automatically regulates the exposure time in dependence on the ambient light, the timing being initiated by the flash contact in the camera shutter. For this purpose a cable 17 is provided connecting this contact, which in FIG. 5 is denoted by $S_7$, with the switching device 16 shown herein and described in detail below. In the device there is an electromechanical clutch M between an actuating member 18 and a flexible release cable 20 which is inserted in the cable release connection 19 of the camera 15, the clutch allowing the plunger of the release cable 20 acting on the release mechanism of the camera to return to a normal position before pressure release of the actuating member 18, to end the exposure time. Short exposure times of less than one-thirtieth sec. are readily obtainable with such a release device. The exposure period is dependent only upon the resistance value of the photoelectric resistor $R_7$ built into the time controlling device 16 and located behind a transparent window 21 as determined by the prevailing light conditions.

For the photographer using such an apparatus it may, under certain circumstances, be important to know whether the exposure time to be expected due to the light conditions lies below or above a certain limit time value, of for example one-thirtieth sec., before making an exposure. In addition, the photographer must be able to ascertain the state of the battery $E_3$ to ensure that correct exposures will be given by the automatic timing circuit. To enable such a test to be carried out in a simple manner, the time control device 16 of FIGS. 4 and 5 is equipped with the trigger circuit of FIG. 2, and also with a twin-bladed test key 22. The latter is associated in such a manner with two switching circuits that when pressure is applied to one blade 22a the energy source $E_3$ is tested, and when pressure is applied to the other blade 22b of the key a limit time test is carried out.

As shown more in the circuit diagram (FIG. 5) of the timing device including the testing and indicating device, pressure applied to the blade 22a by means of the switching finger 22c provided on the test button 22 cause the contact switch $K_3$ formed by two switching blades $K_3'$ and $K_3''$ to be displaced simultaneously into contact with two contacts $a_3$ and $b_3$ respectively. The control grid of a thyristor Ty is connected to the voltage divider formed by the two resistors $R_8$ and $R_9$. Whether the thyristor Ty strikes depends upon the voltage of the energy source $E_3$ and the setting of the variable resistor $R_9$. The resistor $R_9$ is to be so set that the thyristor Ty just strikes when the energy source $E_3$ has the lowest permissible voltage. Current then flows from the energy source $E_3$ to a lamp 23, contact $c_4$ of contact switch $K_4$, a closed contact of $K_3$ and the thyristor Ty back to the energy source $E_3$. When the lamp 23 lights up this means that the energy source still has sufficient voltage and consequently is still usable. Otherwise the energy source $E_3$ will have to be renewed.

Depressing the blade 22b of the test key 22 causes the contact switch $K_4$ to be actuated, i.e. one blade $K_4'$ is disengaged from contact $C_4$ and is connected to the contact $a_4$. The other switch blade $K_4''$ makes contact with $b_4$. Since the switches $S_8$ and $S_9$, which are simultaneously changed over only when the actuating member 18 is depressed, assume the positions shown during the testing procedure, the voltage at the input of the trigger circuit comprising the transistors $T_1$ and $T_2$ is determined by the variable voltage divider consisting of the photoelectric resistor $R_7$ and the resistor $R_{10}$. The variable resistor $R_{10}$ is set so that the voltage at the input of the trigger circuit remains just below the operating value thereof, when the photoelectric resistor is of such a limit value as to provide an exposure time of one-thirtieth sec.

If during the testing procedure, the resistance value of the photoelectric resistance $R_7$ due to ambient light conditions is lower than the aforesaid limit value, then this means that a subsequent operation of the time control device 16 will result in an exposure time which is shorter than the said limit exposure time. During the testing procedure the trigger circuit reaches its threshold value or "triggers", and transistor $T_3$ is blocked so that the lamp 23, which by closure of the contacts $a_4$ and $b_4$ of the contact switch $K_4$ is connected in the collector circuit of the transistor $T_3$, does not light up. It should also be noted that with this testing procedure, the negative pole of the energy source $E_3$ due to the contact position of the switch blade $K_4''$ of the contact switch $K_4$, is connected to the part of the circuit containing the three transistors. When the photoelectric resistor $R_7$ has a resistance value which corresponds to an exposure time of longer duration than the limit exposure time of one-thirtieth sec., the trigger circuit remains inoperative, with the result that the transistor $T_3$ remains conductive and hence the lamp 23 lights up.

It will be understood that the foregoing description with the details of exemplary structure is not to be construed in any way to limit the invention, but that modification may be made thereto without departing from the scope of the invention as set forth in the following claims:

We claim:

1. A photographic camera comprising:
   circuit means;
   electronic timing means associated with said circuit means for automatically controlling the exposure time;
   an energy source in said circuit means;
   a photo-resistance associated with said circuit means;
   indicating means associated with said circuit for indicating the light-dependent exposure time value, said indicating means being adapted to be supplied with current by another energy source or by said energy source in said circuit means; and
   said circuit means including two circuits for testing the voltage and capacity of said energy sources and for indicating the attainable exposure time value with respect to a certain limiting value, said two circuits may be brought into operation by a single, manually operable test key.

2. The photographic camera of claim 1 wherein said test key is movable into two alternate switching positions, said test key in one of said switching positions connecting said energy source to said electronic timing means by means of a movable contact switch, and wherein said test key in the other of said switching positions connects said another energy to said indicating means by activation of another contact switch.

3. The photographic camera of claim 1 wherein a separate time control instrument with a built-in energy source is provided, said instrument being attachable to said camera to regulate time and having indicating means for indicating the limiting value of the exposure time where, in one switching position of said test key, said built-in energy source of the electronic circuit is admitted by means of a contact switch and where, in the other switching position of said key, the switching circuit of said indicating means is connected by means of another contact switch to said built-in energy source.

4. The photographic camera of claim 2 wherein said test key acting on said contacts is designed as a two-wing rocking switch tiltably mounted on a shaft.

5. The photographic camera of claim 3 wherein said test key is designed as a rocking switch and is provided with an additional switching finger operable to act on said contact switches for said built-in energy source.

6. The photographic camera of claim 2 wherein a sliding knob movable into two switching positions serves as a common operating element for said contact switches.